(12) United States Patent
Kreter et al.

(10) Patent No.: US 10,458,807 B2
(45) Date of Patent: Oct. 29, 2019

(54) AUGMENTED REALITY SYSTEM FOR VISUALIZATION OF TRAFFIC INFORMATION IN A TRANSPORTATION ENVIRONMENT

(71) Applicant: ITERIS, INC., Santa Ana, CA (US)

(72) Inventors: Todd W. Kreter, Irvine, CA (US); Michael T. Whiting, Rancho Santa Margarita, CA (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 16/277,424

(22) Filed: Feb. 15, 2019

(65) Prior Publication Data

US 2019/0257666 A1    Aug. 22, 2019

Related U.S. Application Data

(60) Provisional application No. 62/631,712, filed on Feb. 17, 2018.

(51) Int. Cl.
| | |
|---|---|
| G01C 21/36 | (2006.01) |
| G06F 3/0481 | (2013.01) |
| H04W 28/02 | (2009.01) |
| G06T 19/00 | (2011.01) |

(52) U.S. Cl.
CPC ..... *G01C 21/3635* (2013.01); *G01C 21/3691* (2013.01); *G01C 21/3697* (2013.01); *G06T 19/006* (2013.01)

(58) Field of Classification Search
CPC ..... G01C 21/3635; G01C 21/36; G06F 17/30; G06F 3/0481; G08G 5/06; G08G 5/00; H04W 28/02; G09B 9/04
See application file for complete search history.

(56) References Cited

U.S. PATENT DOCUMENTS

| | | | |
|---|---|---|---|
| 5,660,547 A * | 8/1997 | Copperman | A63F 13/10 434/29 |
| 2004/0068364 A1* | 4/2004 | Zhao | G01C 21/3492 701/468 |
| 2009/0164113 A1* | 6/2009 | Kang | G01C 21/3608 701/443 |

(Continued)

*Primary Examiner* — Yuri Kan
(74) *Attorney, Agent, or Firm* — Lazaris IP

(57) ABSTRACT

An augmented reality visualization framework for precision traffic analysis combines traffic data with content representative of physical-world characteristics, such as conditions in an intersection or roadway in which traffic activity occurs, and images of the intersection and roadway itself. The framework includes a visualization platform that enables display of the combined traffic data and content representing physical-world characteristics, and continual augmentations of such information in response to adjustments directed by users or automatically detected from actions such as user movement, other user manipulation, or movement of the visualization platform itself. The framework enables traffic applications such that a user can, when the platform is interfaced with intersection or roadway equipment, adjust machine activity or signal timing based upon the visualizations or data presented via the visualization platform. The visualization platform may also be configured to present the traffic data, and the content representative of physical-world characteristics, in a virtual reality setting.

29 Claims, 2 Drawing Sheets

(56) References Cited

U.S. PATENT DOCUMENTS

| | | | | |
|---|---|---|---|---|
| 2015/0003236 A1* | 1/2015 | Tsuda | ............... | H04W 28/0226 370/229 |
| 2015/0046884 A1* | 2/2015 | Moore | ................. | G06F 3/0481 715/863 |
| 2015/0292899 A1* | 10/2015 | Ohashi | ............... | G01C 21/3667 701/533 |
| 2016/0140849 A1* | 5/2016 | Ball | .................... | G08G 5/0021 701/538 |
| 2016/0140855 A1* | 5/2016 | Gannon | ................ | G08G 5/065 701/533 |
| 2016/0154856 A1* | 6/2016 | Olof-Ors | .......... | G06F 16/24578 707/728 |

* cited by examiner

AUGMENTED REALITY SYSTEM FOR VISUALIZATION OF TRAFFIC INFORMATION IN A TRANSPORTATION ENVIRONMENT

CROSS-REFERENCE TO RELATED PATENT APPLICATION(S)

This patent application claims priority to U.S. provisional application 62/631,712, filed on Feb. 17, 2018, the contents of which are incorporated in their entirety herein. In accordance with 37 C.F.R. § 1.76, a claim of priority is included in an Application Data Sheet filed concurrently herewith.

FIELD OF THE INVENTION

The present invention relates to augmented reality systems, and to vehicular traffic management in transportation systems. Specifically, the present invention relates to a system and method for combining traffic data with actual-world reality, such as an image or video of an intersection or roadway in which a vehicle or other object represented by or relative to the traffic data is shown, to provide an augmented, virtual, or mixed-reality environment for precision traffic management applications.

BACKGROUND OF THE INVENTION

Implementations of augmented and/or virtual reality in the field of transportation systems are presently very limited. Applications exist that allow users to view data that is overlaid on a map of a particular geographical area, for example on mobile devices. Overlaid data may include intersection or roadway-specific, activity-specific, and machine-specific data, and users can tap or select particular information, or particular areas of an intersection or roadway, for further detail. However, development of these applications is rudimentary, and has not reached a stage to where cities, counties, states, and other responsible entities can view visualizations of an intersection or roadway that are augmented with such data rather than simple overlays, for example using a wearable device. Additionally, development of these applications has not reached a stage where continuous augmentations of sophisticated traffic information are possible, nor have they reached a stage where they can be adjusted based on real-time user input.

It is to be understood that virtual reality, or VR, refers to the creation of a virtual world that users can interact with, and in which users would find it difficult to tell the difference from what is real and what is not. Meanwhile, augmented reality, or AR, is the blending of virtual reality and real life, in which images may be created within applications that blend in with contents in the real world. With AR, users are able to interact with virtual contents in the real world, and are able to distinguish between the two. Virtual reality and augmented reality are similar in the immersion of the user, though this is accomplished in different ways. With AR, users continue to be in touch with the real world while interacting with virtual objects around them. With VR, the user is isolated from the real world while immersed in a world that is completely, or almost completely, fabricated.

BRIEF SUMMARY OF THE INVENTION

The present invention provides a framework within which traffic information is presented to users in an augmented or mixed-reality setting. Such a framework allows users to view or display selected information in relation to content representing a physical-world characteristic, such as an actual intersection or roadway for which such traffic information is of interest. One or more data processing techniques enable the augmented combination of traffic information and the content representing the physical-world characteristic.

Both augmented and virtual reality systems can be used to supplement existing reality representations of the actual world, usually by incorporating information and graphics into a captured image or video stream or a transparent display surface. Such systems can be used, in conjunction with their internal components, to display traffic, environmental and situational data, markers, and visualizations for areas of interest (AOIs) and points of interest (POIs). Various traffic-related data elements may be combined together, through data processes or through transparencies or blending techniques, along with imagery or video of the environment surrounding the display apparatus or visualization platform. These traffic-related data elements are continuously augmented and adjusted according to the visualization platform's capabilities (e.g., movement, tilting, panning, zooming, etc.) and/or by user movement or manipulation of the visualization platform.

It is therefore one objective of the present invention to provide a system and method of displaying traffic information to a user in an augmented reality system. It is another objective of the present invention to present such data in combination with one or more images of an actual intersection or roadway on augmented reality-enabled devices. It is yet another objective of the present invention to present advanced algorithms and traffic analytics to users as they traverse an intersection or roadway, using or wearing augmented reality-enabled devices. It is a further objective of the present invention to enable users to interface with intersection or roadway equipment such as traffic cabinets and signaling systems by manipulating an augmented reality system relative to an intersection or roadway in which the intersection or roadway equipment is utilized.

Other objects, embodiments, features, and advantages of the present invention will become apparent from the following description of the embodiments, taken together with the accompanying drawings, which illustrate, by way of example, principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

Figure 1:
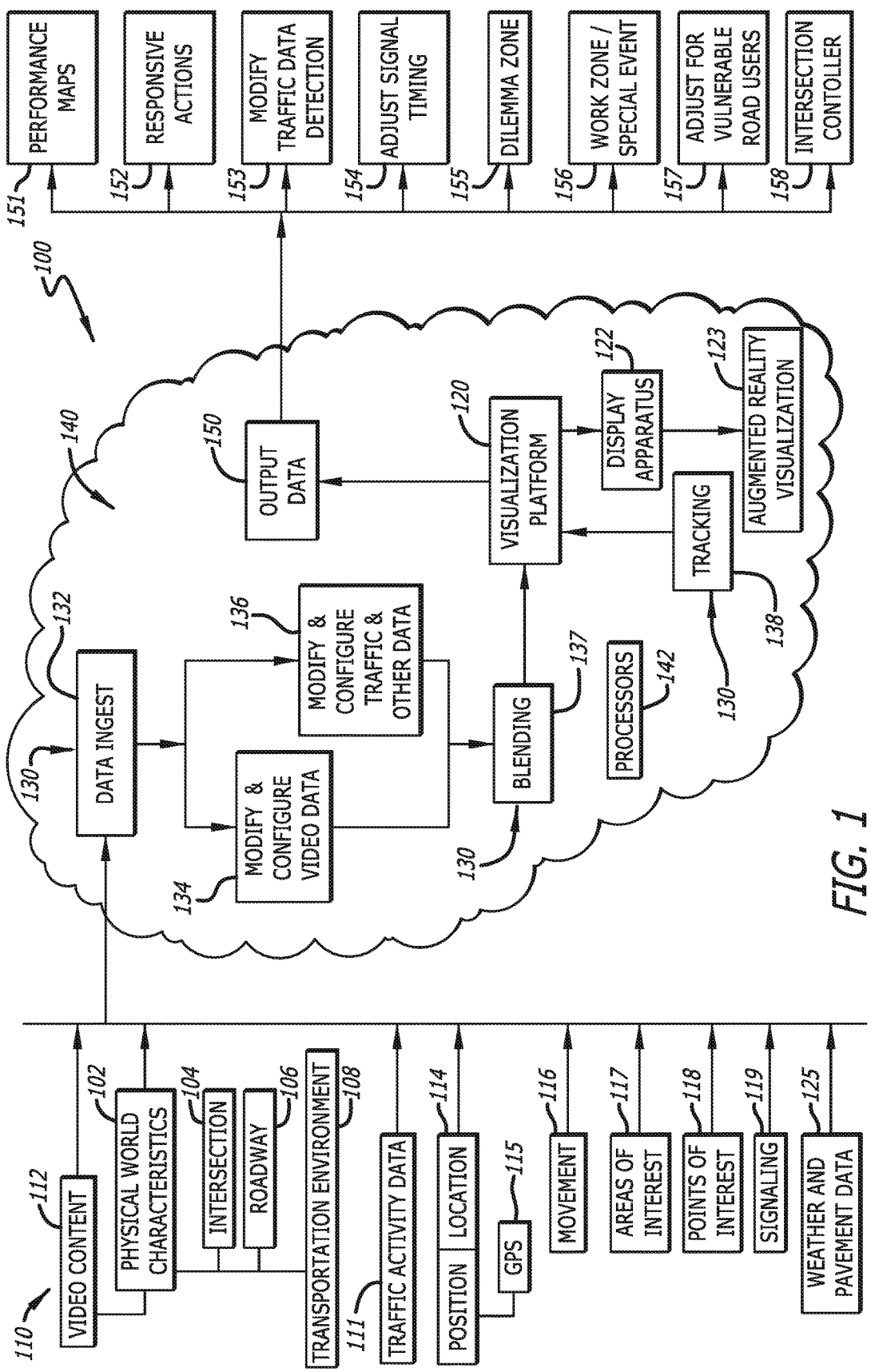
FIG. 1 is a block diagram illustrating system components in an augmented reality visualization framework for traffic applications according to one embodiment of the present invention.

The present invention is an augmented reality visualization framework 100 for traffic and transportation applications. FIG. 1 is a systemic diagram of components in such an augmented reality visualization framework 100 for traffic and transportation applications, in which content representative of a physical-world characteristic 102 is augmented with input data 110 representative of traffic activity 111 to generate an augment reality visualization 123. In one aspect thereof, the present invention is an application of traffic data elements in this traffic activity 111 to an augmented or mixed reality setting, where a user is able to view selected information in relation to an actual intersection or roadway for which such information is of interest, and to adjust that information, within the augmented reality visualization 123. In another aspect thereof, the traffic and roadway augmented reality visualization framework 100 includes a visualization platform 120, within and upon which such an application of traffic data elements 111 to an augmented or mixed reality setting is performed to generate the augmented reality visualization 123.

The visualization platform 120 may include a display apparatus 122 upon which a user is capable of viewing the combination of traffic data elements 111, and content representing physical-world characteristics 102 related to such information, such as an intersection 104 or roadway 106 in which a vehicle or other object is shown or in which traffic signaling equipment 119 is operating, together comprising a transportation environment 108. A display apparatus 122 may include a wireless augmented or virtual reality headset or other similar head-mounted (or other wearable) gear capable of projecting images through one or more lenses for viewing by a wearer or user. The display apparatus 122 may be any article or device configured to allow a user to view the application of traffic data elements 111 as an overlay on the physical-world characteristic(s) 102 representing the transportation environment 108, as well as manipulate the traffic data elements 111 displayed in some manner.

In one example in which the present invention is implemented, a user visiting the transportation environment 108 may direct their head-mounted display at the scene comprising intersection 104 or roadway 106, and select any number of overlays to view related to traffic activity in that scene. The user may also adjust opacity levels for each overlay, and see areas of interest (AOIs) and/or point of interest (POIs) displayed on top of the intersection 104 or roadway(s) 106 visible through the display. In another example, a user visiting a scene of the transportation environment 108 comprising a traffic intersection 104 or roadway 106 may direct a mobile device to capture a video stream of the scene or environment (e.g., the intersection 104 or roadway 106) in front of the device's camera, select any number of overlays to view, adjust opacity levels for each overlay, and see AOIs and/or POIs overlaid on the intersection 104 or roadway(s) 106 visible through the display.

In yet another example, an operator (the user) may view a projection on or within windows of a machine that displays, among other selectable overlays, the outline of transportation environment 108, the area of the transportation environment 108 already covered by the machinery implement or other cooperating implements, the location of other machines in the transportation environment 108, and any other information to help the operator visualize and locate other machines or objects in the scene. This may additionally include information to assist in coordinating joint operations involving traffic equipment (e.g., setting up a work zone), and planning of future operations involving such equipment (e.g., turns to avoid obstacles, visualizing the width of lanes).

Other examples of a display apparatus 122 embodying the visualization platform 120 on which the augmented reality visualization 123 are rendered include a mobile phone or other computing device, such as tablet or laptop computer, holographic displays such as images shown on glass or a window (e.g., a projection within the glass), wearables such as Google Glass and VR helmets [e.g., Oculus Rift, HTC Vive, etc.], and Microsoft HoloLens, etc. A display apparatus 122 may further include a heads-up display (e.g., projection onto glass), a pop-up display, or a 3-D projection. It is therefore to be understood that the present invention is not to be limited to any one type of display apparatus 122 mentioned herein, and that any type of display may be configured for the traffic and roadway augmented reality visualization framework 100 for transportation applications of the present invention.

The present invention is embodied in one or more systems and methods that enables such combinations of traffic data elements 111 with physical-world characteristics 102 representing a transportation environment 108, such as imagery and mapping of geographical areas related to these traffic data elements 111. These systems and methods are performed, in one aspect of the present invention, in a plurality of data processing modules 130 that are components within a computing environment 140 that also includes one or more processors 142 and a plurality of software and hardware components. The one or more processors 142 and plurality of software and hardware components are configured to execute program instructions or routines to perform the components, modules and data processing functions described herein, and embodied within the plurality of data processing modules 130.

These processors 142, components and data processing functions together accomplish the combination of traffic data elements 111 with physical-world characteristics 102 for visualization in an augmented or mixed reality setting according to the present invention. This includes the capture and/or display of content as input data 110 representing traffic-related activity 111 relative to a physical-world characteristic 102, using a display apparatus 122 or other visualization platform 120. Such content/input data 110 may include video 112 of an intersection 104 or roadway 106 comprising a transportation environment 108, and shown or streamed on a screen of a device such as virtual reality headset. Such a video stream 112 may be captured by the device itself, or acquired from an external source. The video stream 112 may therefore also be a real-time representation of the intersection 104 or roadway 106 and conditions currently being experienced therein.

The plurality of data processing modules 130 may therefore include a data ingest module 132 configured to ingest, capture, request, receive, or otherwise obtain the input data 110. Several other modules 130 may be included as further described herein, including a module 134 for configuring and modifying data relative to the physical-world characteristic 102 for display on the visualization platform 120, and a module 136 for configuring and modifying traffic data 111 and other input data 110 for display on top of the data relative to the physical-world characteristic 102 on the visualization platform 120. The modules 134 and 136 may perform this configuration and modification of traffic data 111 by one or more of filtering, ordering, adjusting, or otherwise transforming according to, for example, the view of the user, and manipulation of the visualization platform 120 by the user. Other components 130 include a blending module 137 that applies one or more techniques for combining the various types of input data 110 with the data relative to the physical-world characteristic 102, and a tracking module 138 that enables the framework 100 to continually augment the information provided to the user via the visualization platform 120.

The input data 110 also includes the detection of a geographic position 114 of a user or the visualization platform 120, as well as movement 116, such as direction, motion, tilt, or other motion of the user or visualization platform 120. Therefore, one or more global positioning system (GPS) components 115 may be included within the present invention, including a GPS-enabled receiver configured to correlate such movement 116 with information related to both the traffic activity 111 and intersection 104 or roadway 106 data to be displayed by computing the user's precise position and orientation in the transportation environment 108 relative to the Earth. The GPS-enabled receiver of the GPS components 115 may thus extract and determine the geographical location 114 of the user relative to that of the transportation environment 108 for which information is sought from GPS data points.

The present invention also includes sending a request for nearby traffic activity information 111, such as traffic, environmental and situational areas of interest (AOIs) 117 and places of interest (POIs) 118 based on search criteria. Such search criteria may be defined by the user according to the type of information sought. GPS data points regarding the location 114 of the user or the visualization platform 120 itself also allow for obtaining or ingesting the correct traffic information 111 requested. A request may be initiated by the user or may be automatically generated, for example as a result of information extracted from such GPS data points or by detected action in the user or visualization platform 120. A further step of receiving such nearby traffic, environmental and situational AOIs 117 and POIs 118, in response to the request, is another function performed in the present invention.

The present invention further includes visually augmenting the captured and/or displayed video stream 112 with the information received for the nearby AOIs 117 and POIs 118. The visual augmentation may occur in any number of ways. For example, augmentations may be presented in the form of colorized, three-dimensional regions overlaid on top of geographical features for the intersection 104 or roadway 106 being viewed, floating imagery (small popup imagery, thumbnails, previews, etc.), flags or other markers, and icons and other iconography. Examples of colorized, three-dimension regions include an exaggerated topological color-map overlaid on a region of interest at the level of an intersection 104 or roadway 106, such as to show the minute differences in elevation for use while performing operations in the transportation environment 108. Other examples of colorized, three-dimension regions include maps and maps of vehicle placement zones. The information received for the nearby AOIs 117 and POIs 118 may also be filtered, ordered, adjusted, or transformed based upon user input.

The present invention also includes visually augmenting the captured and/or displayed video 112 with information from signaling equipment 119 at or near an intersection. Signaling equipment 119 may be associated with a system of traffic lights or other equipment 108, a traffic signal controller 158, with one or more signs posted at the intersection 104, or traffic notification systems, such as those that provide different types of notifications to certain roadway users such as pedestrians and bicyclists.

Information presented in visual augmentations or visualizations may also include scouting reports (representing, for example, locations scouted, areas of concerns, noteworthy items, etc.), objects located in intersection or roadways (such as equipment or machines, debris, obstacles, wet spots, etc.), prior tracks of equipment and unintended items in the intersection 104 or roadway 106.

Visual augmentations or visualizations may also include live-streamed, retrieved, raw, processed, analyzed, transmitted, collected, and/or combinations of one or more of the aforementioned, and of additional data elements such as UAV sensor data, other autonomous vehicle data, satellite sensor data, vehicular yield data, topological data, temperatures, etc., as well as specific maps showing roadway properties, maps or datasets, and as-applied maps or datasets, and any other analyzed data sets.

Traffic-related activity data 111 for visualizations may come from many different sources. Examples of such sources include sensors within the visualization platform 120 or its host, previously-stored information, data acquired directly by traffic equipment such as machines, and vehicles (in-intersection or roadway or otherwise), and/or sensors and their related systems (associated with such as equipment or otherwise), and both publicly-available and privately-acquired data sources. Input data 110 may also be provided, as noted above, by signaling equipment 119 located at or near a traffic intersection 104, either associated with a system of traffic lights, with one or more signs posted at the intersection 104, or with other traffic notification systems.

There are many other types of traffic activity data 111 that may be utilized to augment a display of a physical-world characteristic 102 or setting. Such data 111 may include a color-map overlaid on a region of interest, a vehicle yield map, a work management zone, special event information, current or expected traffic signal timing, and one or more of vehicle, bicycle, pedestrian, or object counts in the intersection 104 or roadway 106, or weather or pavement conditions 125, either currently being experienced or over a period of time. Such weather or pavement conditions 125 may include temperature and moisture at various locations. Still other types of traffic activity data 111 may include vehicle density, vehicle velocity, and vehicle or object classification and identification, for example as a vulnerable roadway user (such as a pedestrian or bicyclist).

Many other components of a visualization platform 120 within the framework 100 are possible and within the scope of the present invention. The visualization platform 120 may include a display or screen, and one or more input devices that are capable of acquiring input data 110, such as relative-position sensors and cameras, an accelerometer, a compass, and as noted above, one or more GPS components 115. Other hardware that may be included in the visualization platform 120 are memory components or units, one or more computer processors, data storage components, a communications interface, and a graphics accelerator. One or more projectors may also be included to convey video streams and incoming data on the display apparatus 122.

The traffic and roadway augmented reality visualization framework 100 for transportation applications of the present invention analyzes input data 110 and traffic activity information 111 for presentation in many different ways, and the outcome of these analyses may be considered as output data 150 of the framework 100. As an example, if an agency has two or more years' worth of data for vehicular activity in a particular intersection or roadway, one data processing function in the present invention might be to produce as output data 150 a multi-year performance map 151 for visualization on a view of the scene of an actual intersection 104 or roadway 106. A variation on such a performance map 151 might be a map depicting areas that significantly deviated from the average (mean) in one or more years. Yet another map displayed might be one that depicts variance or mean square error, to depict areas of a transportation environment 108 that have experienced significant performance variations year to year.

Many other examples of temporal analytics of traffic activity data 111 such as the multi-year performance map 151 and generally output data 150 are possible and within the scope of the present invention. In one example, the framework 100 may be configured to display an amount of vehicle speed variability from one time period to another. In another example, the framework 100 may be configured to display an analysis of normalized movement over a locally-temporal movement, indicating where too many vehicles may be affecting congestion on a roadway 106.

Output data 150 may also include specific displays of information to facilitate transportation planning and decision-making. One such output may be current volume at the intersection 104 or roadway 106 against average volume, such as for example a 90-day moving average or an average of the last x weeks for a current time of day, day of the week, or other time period (such as monthly, or for the last one, three, or five years data as a further example). Another exemplary output may be a current queue length against an average queue length, again such as a 90-day moving average or average of the preceding x weeks for a current time of day, day of the week, or other time period (such as monthly, or for the last one, three, or five years data as a further example).

Other displays of output data 150 may include generating a display of current volume plotted against typical volume weather for the current day of year, and current queue length plotted against typical weather for the current day of year. Traffic volume during special events (sports, concerts, etc.) may be displayed as compared to current traffic volumes. Additionally, before-and-after information based on changes to signal timing or changes to approach layout (changing the number of left turn lanes for example) or due to construction (increasing approach size) may also be generated and displayed on the visualization platform 120, as well as before-and-after information based on a construction project (such as for example a new shopping mall, office building, or multi-unit residential building).

Combinations of traffic activity data 111, and content related to a physical-world characteristic 102 (as well as continuous and adaptive augmentations of such combinations) may be further performed using additional data processing functions. For example, transparency or blending techniques may be applied to one or more data sets for graphical presentation on the display apparatus 122 of the augmented reality visualization framework 100. In the augmented reality visualization framework 100 of the present invention, whether a user is on the edge of an intersection 104 or roadway 106 or within an intersection 104 or roadway 106, the user is able to "look" around and see the above data overlaid on the actual transportation environment 108 (or more than one layer of data at a time, with or without some transparency for the layers).

It should be noted that in many cases, just having the data is not always helpful—it may need to be acted upon. For example, in an analysis of normalized movement over a locally-temporal movement that indicates where too many vehicles may be affecting congestion, a user standing in transportation environment 108 be able to immediately diagnose and take action about the diagnosed issues, for example by operating equipment while using a visualization platform 120 as in the present invention to identify trouble spots. Output data 150 may therefore comprise one or more actions 152 that a user takes in response to data analytics within the framework 100. There are many examples of where a physical-world outcome of data analytics using a visualization platform 120 in the framework 100 of the present invention may be realized.

In one such example, output data 150 may be used to identify possible problems with either detection quality or controller response, and therefore one action 152 is initiating a change in traffic data detection paradigms 153 and/or adjustments in traffic signal timing and control 154 at a transportation environment 108. Such an action 152 may be determined, for example, by evaluating the current versus normal cycle time data for a traffic phase, or by evaluating historic traffic volumes but based under current or forecasted weather conditions within the visualization platform 120. Examples of adjusting traffic signal timing and control 154 include implementing alternate signal timing or phase patterns at an intersection 104 or roadway 106. Historic versus current volumes of traffic activity by vehicle classification (for example, motorcycles, passenger cars, trucks, busses, etc.) may also be used implement alternate signal timings or phase patterns as actions 152 taken as a result of analytics using the visualization platform 120.

In another example, output data 150 may include adjusting traffic signal dilemma zone timing 155 (in conjunction with alternate signal timing or phase patterns) specifically in relation to the speed of vehicles as they approach an intersection 104 or roadway 106, or vehicular speed in general, within a transportation environment 108. Output data 150 may also include adjusting work zone or special event operations 156. For example, if a user diagnoses that traffic activity is negatively impacted by a work zone or special event (or vice versa) in the transportation environment 108 and this can be remedied, the present invention may generate an instruction to adjust one or more of signal timing, phase cycles, machinery operation, work zone/special planning, or take other remedial action.

In a further example, output data 150 may include adjusting traffic signal timing and control 154 (such as implementing alternate signal timing or phase patterns) specifically in relation to vulnerable road users (VRUs) such as pedestrians, cyclists, and motorized scooter users, by analyzing historic volumes for such VRUs in comparison with current volumes. Therefore, one additional responsive action 152 is an adjustment 157 to the signal timing and control for vulnerable road users.

In still another example, output data 150 may comprise a signal or instruction to a traffic signal controller 158 itself. The framework 100 may therefore be configured to communicate directly with traffic signal controllers 158 as a result of user manipulation of the visualization platform 120.

The framework 100 is also capable, as noted throughout, of continual augmentation. For example, if the perspective of the visualization platform 120 is altered (via movement, tilting, panning, zooming, etc.), the visualization itself will be adjusted to compensate for the difference of perspective. Additionally, the augmented reality visualization framework 100 may be configured to track the intersection 104 or roadway 106 in the view of the user wearing headgear or other device, or to track orientation and movement of a user using a mobile device while looking at data overlaid on a rendering of the transportation environment 108, and adjust data displayed accordingly. Therefore, the framework 100 is responsive to both user interaction and movement vis-à-vis the visualization platform 120.

Regarding tracking of orientation or movement of, or manipulation by, a user, the framework 100 may be configured to response to user activity in many ways. For example, when a user manipulates the display of a visualization platform 120 by touching, tapping or clicking on a traffic signal, the framework 100 may provide different types of data such as arrivals on red, arrivals on yellow, arrivals on green, and percentages for each, to indicate an efficiency of approach and level-of-service scores. In another example, a user may touch, tap or click on a safety icon on the display apparatus 122 to provide data on red light runners, number of vehicles detected in a dilemma zone, counts of vulnerable road users, work zone management data such as number of workers present and hours of planned maintenance activity, emergency vehicle and/or police activity, or other safety concerns. The framework 100 may also respond by using zooming functions to focus data displayed, for example on volume data at a stop bar, or advanced approach speed.

Regarding tracking of an intersection 104 or roadway 106 in the view of the user, the framework 100 may be configured so that when a user is viewing two approaches at an intersection 104 simultaneously, the framework 100 initiates a display of output data 150 representing traffic in-flow and out-flow volume between the two approaches. Similarly, when the user is viewing both the approaching and departing traffic on an approach at the intersection 104, the framework 100 initiates a display of output data 150 representing traffic in-flow and out-flow volumes. The framework 100 may also respond by using zooming functions to focus data displayed based on tracking of the user's view, for example by zooming into a stop bar and displaying stop bar volume data, or advanced approach speed relative to a position of the roadway 106 tracked in the user's view.

Additionally, it should be noted that user interaction may be both verbal and physical. The visualization platform 120 may therefore be response to both verbal commands by a user, and tactile/touch input from the user, as well as by movement, tilting, panning, zooming, and other motion. For example, the user may speak a command that instructs the framework 100 to zoom into the stop bar, and further, to display stop bar volume data. The framework 100 may alternatively automatically display stop bar volume data in response to a command to zoom into the stop bar. As a further example, the user may speak a command that instructs the framework 100 to zoom into a bicycle lane or crosswalk, and further to display vulnerable road user volume data. The framework 100 may alternatively automatically display such VRU volume data in response to a command to zoom into the bicycle lane or crosswalk.

The physical-world characteristics 102 combined with traffic data elements 111 may also include weather-related conditions affecting transportation activity in a particular intersection 104 or roadway 106. Data representative of weather-related conditions may include recent and current intersection or roadway-level weather data and short-term weather forecast data, and may further include historical, predicted, and other weather information, from many different sources as noted further herein. Recent and current intersection or roadway-level weather data may represent in-situ or remotely-sensed observations for a particular intersection or roadway, and may be derived from or provided directly via one or more crowd-sourced observations in the addition to the sources mentioned herein. The data representative of weather-related conditions may be ingested into the present invention in raw, unprocessed form, or as processed data in the form of modeled, predicted or forecasted weather data over particular periods of time, such as short-range weather predictions and long-range, extended, and/or dynamical weather forecasts. Other sources of data representative of weather-related conditions include the output from numerical weather prediction models (NWP) and/or surface networks, and may be combined with data from weather radars and satellites to reconstruct the current and near-term forecasted weather conditions on any particular area to be analyzed. Additionally, internally or privately-generated "mesoscale" NWP models developed from data collected from real-time feeds to global and localized observation resources may also be utilized. The present invention may be configured to ingest data from all types of NWP models, regardless of whether publicly, privately, or internally provided or developed.

Figure 2:
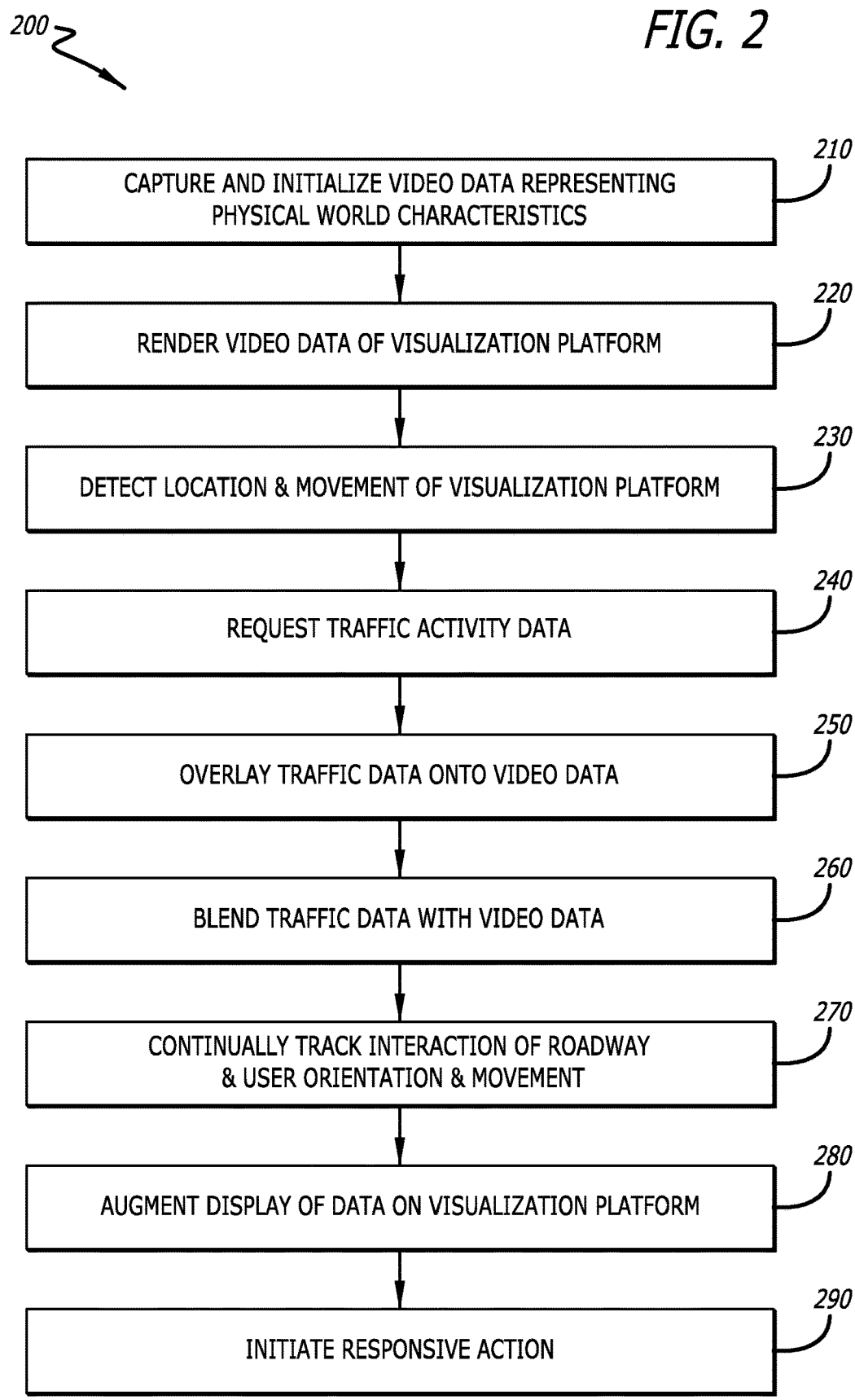
FIG. 2 is a flowchart of steps in an augmented reality visualization framework for traffic applications according to one embodiment of the present invention.

FIG. 2 is a flowchart illustrating steps in a process 200 for performing the augmented reality visualization framework 100 for traffic and transportation applications, according to certain embodiments of the present invention. Such a process 200 may include, as noted above, one or more functions, mathematical models, algorithms, machine learning processes, and data processing techniques for the modules 130 that perform augmentation of content representative of physical-world characteristics 102 relative to an intersection 104 or roadway 106 and input data 110 representing traffic data 111 and other information within such a framework 100, and for the various analytical approaches applied within each module 130.

The process 200 begins at step 210 by initializing content representing physical-world characteristics 102 that include, as noted throughout, an intersection. 104, a roadway 106, or conditions affecting an intersection or roadway where traffic activity occurs. This content is captured by one or more cameras present at the transportation environment 108, and may be initialized before or after ingest by the data ingest module 132. This content includes one or more video images of the one or more physical-world characteristics 102. In addition to video data 112, other types of data representing the intersection 104, roadway 106, or conditions affecting them may also be used, such as for example satellite imagery. At step 220, this video data is rendered for display on the visualization platform 120, by applying the data processing functions performed within the module 134 configured to modify and configure the video data 112 for such a visualization platform 120.

At step 230, the process 200 detects location 114 and movement 116 of the visualization platform 120. This may occur for example from user movement while wearing an augmented reality or virtual reality headset, or other motion or interaction initiated by the user. Location information may be provided by GPS components 115 as noted above, at least some of which may be located in the visualization platform. 120 itself. This information is used to augment the video data 112 shown on the visualization platform 120, and also to prepare the framework 100 for the ingest of traffic activity data 111 and other relevant information to overlaid on the video data 112 representing the physical-world characteristics 102.

Once location 114 and/or movement 116 (or other manipulation of the visualization platform 120) has been detected, the process 200 continues at step 240 by requesting traffic activity data 111 for the relevant intersection 104 or roadway 106, or that specifically requested by the user. This traffic activity data 111 is then provided to the module 136 that modifies and configures this information for the visualization platform 120, and at step 250 this information is overlaid on the video data 112 on the visualization platform 120 for viewing by the user. At step 260, the traffic activity data 111 may be blended with the video data 112 (together with any other ingested information) using the blending module 137 to further augment the display of information related to the physical-world characteristics 102.

The framework 100 continually tracks the user's view of the intersection 104 or roadway 206 at step 270, as well as the user's orientation and movement 116. This may occur within the tracking module 138, to continually augment the information displayed on the visualization platform 120. This continual augmentation occurs automatically, as the user moves and/or manipulates the visualization platform 120 in some manner, whether it is physical, tactile, or verbal. As additional information is captured and obtained by the framework 100, it is rendered for display on the visualization platform in modules 134 and 136, and then presented for display to augment the data already being displayed at step 280. Module 136 may modify and configure this additional information by one or more of filtering, ordering, or otherwise transforming it, particularly in response to user manipulation of the visualization platform 120.

As the process 200 continues with this continual augmentation, the framework 100 can also be used to instruct and/or initialize output data 150, such as generation of performance maps 151 and responsive actions 152, at step 290. As noted above, this output data 150 may take many forms, but it is to be understood that the framework 100 and process 200 may be used to perform many tasks relative to the intersection 104 and roadway 106.

The systems and methods of the present invention may be implemented in many different computing environments. For example, the augmented reality visualization framework for traffic applications may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
   capturing input data representing a physical-world characteristic relative to a transportation environment that includes at least one of an intersection, a roadway, and conditions in the transportation environment where traffic activity occurs, the input data including at least one of a video image, a video stream, or a map of the physical-world characteristic;
   rendering the input data on a visualization platform for display of the at least one of a video image, a video stream, or a map of the physical-world characteristic;
   detecting a geographical position, and one or more of a movement, tilt or a change in direction of the visualization platform;
   requesting traffic data for the physical-world characteristic based on the geographical position and the one or more of a movement, tilt or a change in direction of the visualization platform;
   blending the input data and traffic data by overlaying the traffic data onto the at least one of a video image, a video stream, or a map of the physical-world characteristic to augment the input data with the traffic data on the visualization platform; and
   continually augmenting the input data by modifying the traffic data based on additional input generated by user manipulation of the visualization platform, to generate an augmented reality visualization of the physical-world characteristic; and
   initiating one or more responsive actions from the augmented reality visualization of the physical-world characteristic, the one or more responsive actions including at least one of modification of traffic data detection, and an adjustment of a traffic signal timing.

2. The method of claim 1, wherein the visualization platform is a display apparatus worn by a user.

3. The method of claim 1, wherein the one or more of a movement, tilt or a change in direction of the visualization platform results from the user manipulation of the visualization platform.

4. The method of claim 1, wherein the user manipulation of the visualization platform includes one or more of tactile, verbal, and orientational manipulation.

5. The method of claim 4, wherein the one or more responsive actions from the continual augmented reality visualization of the physical world characteristic are initiated by the user manipulation of the visualization platform.

6. The method of claim 1, wherein the traffic data includes one or more of traffic activity information, an identification of one or more vulnerable road users, environmental or situational areas of interest, points of interest in the physical world characteristic, scouting reports, objects located in the transportation environment, sensor data, satellite data, vehicle data that includes one or more of a classification of a vehicle and a speed of a vehicle, equipment located within the transportation environment, and tracks of past movement of equipment in the transportation environment.

7. The method of claim 1, wherein the visualization platform is a display apparatus that includes at least one of a mobile device, a wearable device, a display inside a piece of traffic equipment, a holo-glass image displayed inside a piece of traffic equipment, a heads-up display, and a three-dimension projection.

8. The method of claim 1, wherein the input data is further augmented on the visualization platform with one or more of flags, markers, icons, floating images, or colorized three-dimensional overlays.

9. The method of claim 1, wherein the conditions in the transportation environment where traffic activity occurs include one or more of vehicle-related conditions, pavement-related conditions, and weather-related conditions.

10. The method of claim 1, wherein the continually augmenting the input data further comprises creating a virtual reality visualization of the physical-world characteristic with which the user can interact using the visualization platform, wherein the augmented reality visualization is blended with the virtual reality visualization.

11. The method of claim 1, further comprising generating a multi-period traffic performance map for the transportation environment encompassed by the physical-world characteristic.

12. A method, comprising:
   ingesting at least one of a video image, a video stream, or a map as input data representing a physical-world characteristic relative to a transportation environment that includes at least one of an intersection, a roadway, and conditions in the transportation environment where traffic activity occurs;
   analyzing the input data in a plurality of data processing modules within a computing environment in which the plurality of data processing modules are executed in conjunction with at least one specifically-configured processor, the data processing modules configured to generate an augmented reality visualization of the physical-world characteristic, by
      configuring the input data on a visualization platform for display of the at least one a video image, a video stream, or a map;
      determining a geographical position of the visualization platform;
      identifying a manipulation of the visualization platform from one or more of a movement, tilt or a change in direction;
      requesting traffic data for the physical-world characteristic based on the geographical position and the manipulation of the visualization platform;
      overlaying the traffic data onto the at least one a video image, a video stream, or a map of the physical-world characteristic to augment the input data with the traffic data on the visualization platform; and
      continually augmenting the input data by modifying the traffic data based on additional input generated by the manipulation of the visualization platform; and
   generating, as output data, instructions for one or more responsive actions from the augmented reality visualization of the physical-world characteristic, the one or more responsive actions including at least one of modification of traffic data detection, and an adjustment of a traffic signal timing.

13. The method of claim 12, wherein the visualization platform is a display apparatus worn by a user.

14. The method of claim 12, wherein the manipulation of the visualization platform includes one or more of tactile, verbal, and orientational manipulation.

15. The method of claim 14, wherein the one or more responsive actions from the continual augmented reality visualization of the physical-world characteristic are initiated by the manipulation of the visualization platform.

16. The method of claim 12, wherein the traffic data includes one or more of traffic activity information, an identification of one or more vulnerable road users, environmental or situational areas of interest, points of interest in the physical world characteristic, scouting reports, objects located in the transportation environment, sensor data, satellite data, vehicle data that includes one or more of a classification of a vehicle and a speed of a vehicle, equipment located within the transportation environment, and tracks of past movement of equipment in the transportation environment.

17. The method of claim 12, wherein the visualization platform is a display apparatus that includes at least one of a mobile device, a wearable device, a display inside a piece of traffic equipment, a holo-glass image displayed inside a piece of traffic equipment, a heads-up display, and a three-dimension projection.

18. The method of claim 12, wherein the input data is further augmented on the visualization platform with one or more of flags, markers, icons, floating images, or colorized three-dimensional overlays.

19. The method of claim 12, wherein the conditions in the transportation environment where traffic activity occurs include one or more of vehicle-related conditions, pavement-related conditions, and weather-related conditions.

20. The method of claim 12, wherein the continually augmenting the input data further comprises creating a virtual reality visualization of the physical-world characteristic with which the user can interact using the visualization platform, wherein the augmented reality visualization is blended with the virtual reality visualization.

21. The method of claim 12, further comprising generating a multi-period traffic performance map for the transportation environment encompassed by the physical-world characteristic.

22. An augmented reality system for traffic applications, comprising:
a computing environment including at least one computer-readable storage medium having program instructions stored therein and a computer processor operable to execute the program instructions to generate an augmented reality visualization of the physical-world characteristic, the plurality of data processing modules including:
a data ingest module configured to ingest at least one of a video image, a video stream, or a map as input data representing a physical-world characteristic relative to a transportation environment that includes at least one of an intersection, a roadway, and conditions in the transportation environment where traffic activity occurs;
a visualization platform configured to display the input data and traffic for the physical-world characteristic, the visualization platform including a display apparatus that includes at least one of a mobile device, a wearable device, a display inside a piece of traffic equipment, a holo-glass image displayed inside a piece of traffic equipment, a heads-up display, and a three-dimension projection;
a blending module configured to continually augment the input data with the traffic data in the visualization platform, by
configuring the input data on a visualization platform for display of the at least one a video image, a video stream, or a map;
determining a geographical position of the visualization platform;
identifying a manipulation of the visualization platform from one or more of a movement, tilt or a change in direction;
requesting the traffic data for the physical-world characteristic based on the geographical position and the manipulation of the visualization platform;
overlaying the traffic data onto the at least one a video image, a video stream, or a map of the physical-world characteristic to augment the input data with the traffic data on the visualization platform; and
modifying the traffic data based on additional input generated by the manipulation of the visualization platform,
wherein the visualization platform is configured to initiate one or more responsive actions from the augmented reality visualization of the physical-world characteristic, the one or more responsive actions including at least one of modification of traffic data detection, and an adjustment of a traffic signal timing.

23. The system of claim 22, wherein the manipulation of the visualization platform includes one or more of tactile, verbal, and orientational manipulation.

24. The system of claim 23, wherein the one or more responsive actions from the continual augmented reality visualization of the physical-world characteristic are initiated by the manipulation of the visualization platform.

25. The system of claim 22, wherein the traffic data includes one or more of traffic activity information, an identification of one or more vulnerable road users, environmental or situational areas of interest, points of interest in the physical-world characteristic, scouting reports, objects located in the transportation environment, sensor data, satellite data, vehicle data that includes one or more of a classification of a vehicle and a speed of a vehicle, equipment located within the transportation environment, and tracks of past movement of equipment in the transportation environment.

26. The system of claim 22, wherein the input data is further augmented on the visualization platform with one or more of flags, markers, icons, floating images, or colorized three-dimensional overlays.

27. The system of claim 22, wherein the conditions in the transportation environment where traffic activity occurs include one or more of vehicle-related conditions, pavement-related conditions, and weather-related conditions.

28. The system of claim 22, further comprising creating a virtual reality visualization of the physical-world characteristic with which the user can interact using the visualization platform, wherein the augmented reality visualization is blended with the virtual reality visualization.

29. The system of claim 22, wherein the visualization platform is further configured to generate a multi-period traffic performance map for the transportation environment encompassed by the physical-world characteristic.

* * * * *